United States Patent [19]
Lucey et al.

[11] Patent Number: 5,808,813
[45] Date of Patent: Sep. 15, 1998

[54] OPTICAL COUPLER

[75] Inventors: Paul Lucey, Salem, N.H.; Yuri Kazakevich, Andover, Mass.

[73] Assignee: Smith & Nephew, Inc., Memphis, Tenn.

[21] Appl. No.: 741,027

[22] Filed: Oct. 30, 1996

[51] Int. Cl.⁶ .............. G02B 15/14; G02B 7/02; A62B 1/04
[52] U.S. Cl. .............. 359/694; 359/823; 348/65
[58] Field of Search .................. 359/702, 703, 359/694, 697, 704, 821, 824, 691, 701, 823; 348/65

[56] References Cited

U.S. PATENT DOCUMENTS

| | | | |
|---|---|---|---|
| 3,819,267 | 6/1974 | Kawahara | 356/21 |
| 4,611,888 | 9/1986 | Prenovitz et al. | 350/96.22 |
| 4,639,772 | 1/1987 | Sluyter et al. | 38/98 |
| 4,781,448 | 11/1988 | Chatenever et al. | 350/429 |
| 4,874,232 | 10/1989 | Hasegawa | 350/427 |
| 4,947,245 | 8/1990 | Ogawa et al. | 358/98 |
| 4,969,450 | 11/1990 | Chinnock et al. | 128/6 |
| 5,245,475 | 9/1993 | Takasugi | 359/690 |
| 5,394,209 | 2/1995 | Stiepel et al. | 354/81 |
| 5,418,645 | 5/1995 | Coath et al. | 359/676 |
| 5,496,261 | 3/1996 | Sander | 600/163 |

FOREIGN PATENT DOCUMENTS

| | | |
|---|---|---|
| 0 651 272 A2 | 4/1994 | European Pat. Off. |
| WO 96/10947 | 4/1996 | WIPO |

*Primary Examiner*—Georgia Y. Epps
*Assistant Examiner*—Ricky Mack
*Attorney, Agent, or Firm*—Fish & Richardson P.C.

[57] ABSTRACT

A variable-focus variable-magnification optical coupler is provided, for coupling an endoscope to a variety of different cameras having image planes at different positions while maintaining "true-zoom" functioning of the optical coupler. By "true-zoom", it is meant that the focal length of the optical coupler's lens system can be varied without having the image out of focus. That is, once an image is focussed with the optical coupler, the image remains in focus even when the size of the image is changed by a zoom lens of the coupler. In one embodiment, the optical coupler includes an adjustment mechanism which is actuated to move a focus lens and a zoom lens assembly together along the length of the coupler relative to a camera mount. In another embodiment, an adjustment mechanism moves a back focal lens is moved relative to the camera mount to account for the different image plane of the camera.

19 Claims, 7 Drawing Sheets

OPTICAL COUPLER

BACKGROUND OF THE INVENTION

This invention relates to optical couplers and more particularly to those used for coupling an endoscope to a camera.

Generally, endoscopes are instruments for visualizing the interior of an object, such as the human body (e.g., an internal organ or anatomical body passage). A typical endoscope includes an elongated flexible or rigid outer tube within which a lens system is disposed at a distal end. The image of the object being viewed is transmitted through the lens system from the distal end to a proximal end of the tube for viewing by the user or for reception by a camera or an electro-optic image sensor (such as a charge coupled device or CCD). The camera generates a video signal that represents the optical image of the object. After undergoing suitable signal processes, the video signal is displayed on a display device such as a CRT monitor.

Optical couplers have been used to connect endoscopes to cameras and often are capable of providing adjustable focusing, variable magnification (zooming) or both.

SUMMARY OF THE INVENTION

This invention features a variable-focus, variable-magnification optical coupler which can couple an endoscope to a variety of different cameras having image planes at different axial positions relative to the coupler, while maintaining "true zoom" functioning of the optical coupler. By "true zoom," it is meant that the focal length of the optical coupler's lens system can be varied without defocusing the image. In other words, once an image is focussed with the optical coupler, the image remains in focus even when adjusting the magnification of the image with the coupler's "zoom" feature.

In one general aspect of the invention, the optical coupler includes an adjustment mechanism which is actuated to move a focus lens and a zoom lens assembly together along the length of the coupler relative to a camera mount. The adjustment mechanism is used whenever a camera is connected to the optical coupler for the first time, and allows a "one-time" position-fixing step of the focus lens and the zoom lens assembly relative to a camera mount which provides a stationary reference plane of the optical coupler. By moving the focus lens and zoom lens assembly together as a unit, the final image plane of the optical coupler is adjusted to coincide with the image plane of the image sensor of the camera. Thus, different cameras can be used with the optical coupler even though the image planes of their image sensors are positioned at different locations relative to the camera mount which serves as a stationary reference plane of the optical coupler.

In another aspect of the invention, an endoscopic system for providing internal inspection of an object includes an endoscope coupled to the optical coupler described above.

Preferred embodiments may include any of the following features.

The focus lens is disposed at a distal end of the coupler and the zoom lens assembly is disposed between the focus lens and the mount. The zoom lens assembly includes first and second zoom lenses actuated to move relative to each other. The mount is an integral threaded extension of the housing. The focus lens which focuses the image of an object being viewed is moved relative to the zoom lens assembly using a focusing mechanism, while a zooming mechanism moves the first lens and second lens of the zoom lens assembly relative to each other to provide a magnified image of the object.

The adjustment mechanism includes a rotatable adjustment knob and a mechanical coupling which couples the adjustment knob to the focusing mechanism and the zooming mechanism. The focusing mechanism includes a rotatable focus knob and a mechanical coupling which couples the focus knob to the focus lens so that the focus lens moves along the length of the coupler in response to rotation of the focus knob. The zooming mechanism includes a rotatable zoom knob and a mechanical coupling which couples the zoom knob to the first and second zoom lenses. The first and second zoom lenses move relative to each other along the length of the coupler in response to rotation of the zoom knob. Rotating the adjustment knob causes the mechanical couplings of the focusing and zooming mechanisms to move along the length of the coupler. This arrangement allows the focus lens and zoom lens assembly to be moved together as a unit to align the final image plane of the optical coupler with the image plane of the camera's image sensor.

The mechanical coupling of the adjustment mechanism includes an adjustment ring collar coupled between the adjustment knob and the mechanical coupling of the focusing mechanism. The mechanical coupling also includes an adjustment ring coupled between the mechanical couplings associated with the focusing and zooming mechanisms. This configuration allows the focusing and zooming mechanisms to be manipulated independently by the focus and zoom knobs while also allowing them to be moved together under the control of the adjustment mechanism.

The adjustment mechanism includes a biasing mechanism to bias the adjustment collar, the mechanical coupling of the focusing mechanism, the adjustment ring, and the mechanical coupling of the zooming mechanism in compression. The biasing mechanism includes a spring washer positioned between the camera mount and the mechanical coupling of the zooming mechanism. The adjustment mechanism further includes a locking device to fix the position of the adjustment mechanism. Thus, once the adjustment mechanism is set, it can be locked in place without further readjustment.

In one embodiment, the focusing mechanism includes a follower which is moved along a surface of the mechanical coupling of the focusing mechanism by rotating the focus knob. The zooming mechanism includes followers, each of which is coupled to the first zoom lens and the second zoom lens, which are moved along surfaces of the mechanical coupling of the zooming mechanism by rotating the zoom knob. The surfaces of these mechanical couplings are in the form of grooves with the followers riding smoothly within the grooves with little physical effort required by the operator. The housing includes slots formed along its length to prevent the mechanical couplings from rotating when the focus and zoom knobs are rotated.

In another embodiment, the optical coupler further includes a back focal lens positioned between the zoom lens assembly and a proximal end of the housing with the mechanical coupling of the zooming mechanism coupling the zoom knob to the back focal lens.

In another aspect of the invention, a method of endoscopically viewing an object using the optical coupler described above includes coupling an endoscope to a distal end of the optical coupler to convey an image of the object received by the endoscope to the optical coupler; coupling a camera having an image sensor to the mount of the optical coupler; and moving the focus lens and the zoom lens assembly together as a unit along the length of said coupler relative to the image sensor. To adjust the focus lens and zoom lens assembly as a movement, the focus lens is focussed at infinity, the optical coupler with endoscope and camera is pointed at a distant object, followed by, the focus lens and zoom lens assembly moved along the length of the coupler until the distant object is sharply focused. The focus lens and zoom lens assembly are then locked to prevent movement of the focus lens and zoom lens as a unit while allowing them to move independently with respect to each other.

In another aspect of the invention, the adjustment mechanism is configured to move a back focal lens, positioned between a zoom lens assembly and a proximal end of the housing, along the length of the coupler relative to a camera mount. This approach provides an alternative way of adjusting the final image plane of the optical coupler so that the image plane overlies the image plane of the image sensor of a camera mounted to the optical coupler.

In one embodiment, the adjustment mechanism includes a rotatable adjustment knob and a mechanical coupling for coupling the adjustment knob to the back focal lens, which is moved along the length of the coupler by rotating the adjustment knob.

Other features and advantages of the invention will become apparent from the following detailed description, and from the claims.

DESCRIPTION OF THE PREFERRED EMBODIMENTS

Figure 1:
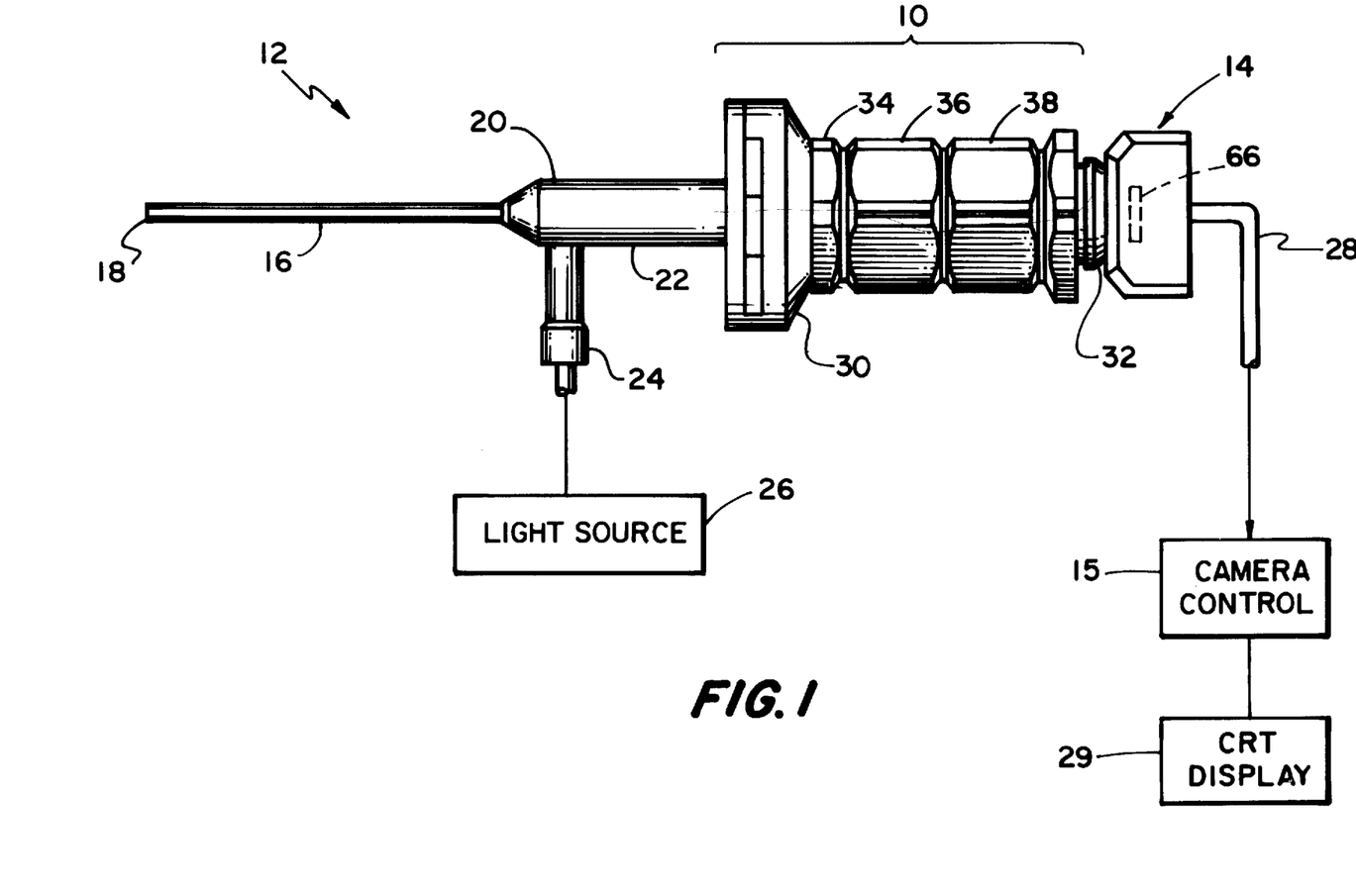
FIG. 1 is a diagrammatic view of an optical coupler connected to an endoscope and a camera.

Referring to FIG. 1, an optical coupler 10 is shown positioned between an endoscope 12 and a camera head 14. Endoscope 12 includes an elongated insertion section 16 for insertion into a cavity or narrow body passage to observe an object therein. Elongated insertion section 16 extends from a distal end 18 to a handle 20 at a proximal end 22 of endoscope 12. Handle 20 permits the user to position elongated insertion section 16 of endoscope 10 appropriately. Illumination enters endoscope 12 through a light guide 24 which is coupled into endoscope 12 near proximal end 22 and provides light to the area of observation from a light source 26. Camera head 14 includes an electro-optic image sensor 66 (e.g., a CCD) which receives the optical image conveyed by a lens assemble (not shown) through endoscope 12 and through optical coupler 10, and generates video signals representative of the optical image. A cable 28 extending from camera head 14 conveys the video signals to a camera control unit 15 having a video processor which processes the video signals for viewing on a display unit, such as a color CRT 29.

Figure 2:
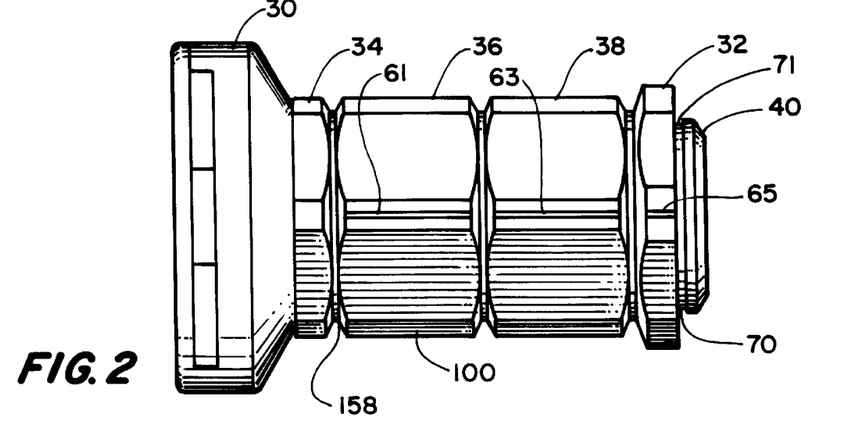
FIG. 2 is a top view of the optical coupler of FIG. 1.

Referring to FIG. 2, optical coupler 10 includes a series of three adjustment knobs arranged in tandem between an endoscope coupling housing 30 and a camera mount 32. The adjustment knobs are formed of anodized aluminum and include an adjustment knob 34, a focus knob 36 and a zoom knob 38, each of which is independently rotatable to move certain lenses within optical coupler 10. Endoscope coupling housing 30 is configured to secure optical coupler 10 to the eyepiece on endoscope handle 20. Camera mount 32 includes threads 40 for receiving camera head 14.

Figure 3:
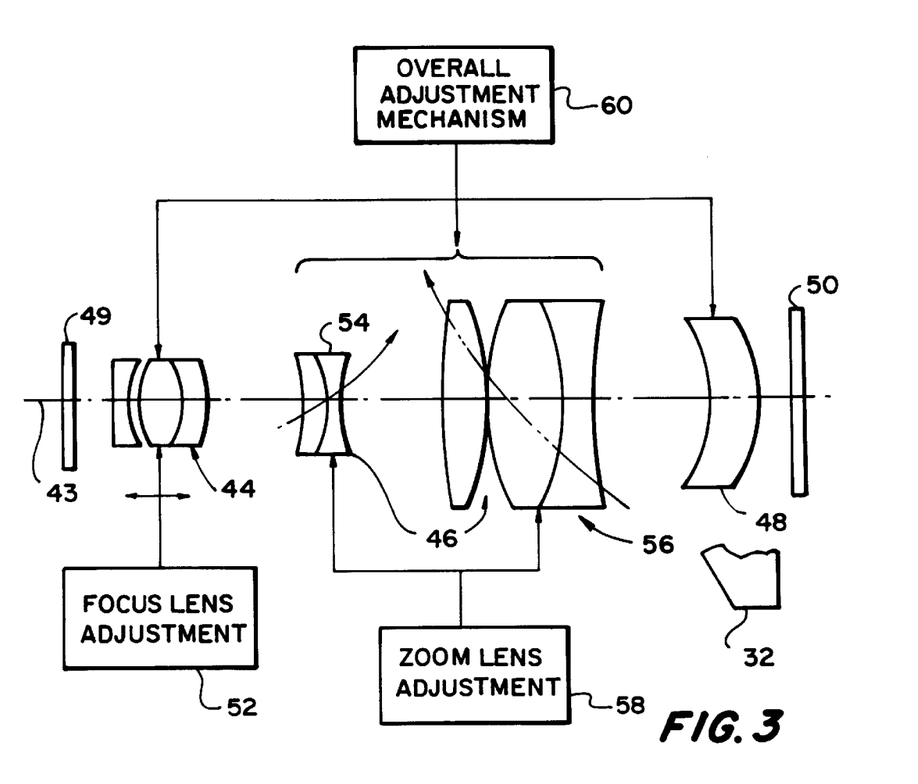
FIG. 3 is a diagrammatic representation of the lens system of the optical coupler of FIG. 2.

Referring also to FIG. 3, a schematic representation of the lens systems of optical coupler 10 is shown. The coupler lens systems include a focus lens group 44, a zoom lens assembly 46, and a back focal lens 48, all of which are arranged along an optical axis 43 between coupling housing 30 (not shown) and camera mount 32. Light conveyed through endoscope 12 enters a front window 49 within endoscope coupling housing 30 and passed through focus lens group 44, zoom lens assembly 46, and back focal lens group 48 before exiting a rear window 50 at camera mount 32.

Focus lens group 44 is moved with respect to the other lenses of optical coupler 10 by a focus control mechanism 52 when focus knob 36 is rotated. Zoom knob 38, a zoom lens control mechanism 58 responds to the rotation of zoom knob 38 by moving zoom lens groups 54, 56 of zoom lens assembly 46 towards and away from each other and with respect to the other lenses of the optical coupler 10. An overall adjustment mechanism 60 is coupled to each of focus lens group 44, zoom lens assembly 44 and back focal lens group 48, moves all of these lenses together in response to the rotation of adjustment knob 34.

Overall adjustment mechanism 60 permits optical coupler 10 to be used with a variety of camera heads 14 the image sensors of which have image planes located in different positions with respect to mount 32. In particular, overall adjustment mechanism 60 adjusts the position of the lenses of optical coupler 10 together with respect to mount 32 to ensure that once the image is focussed on the camera's image sensor with focus lens group 44, it remains in focus throughout the magnification range of zoom lens assembly 46. That is, overall adjustment mechanism 60 provides optical coupler 10 with "true-zoom" capability.

Figure 4:
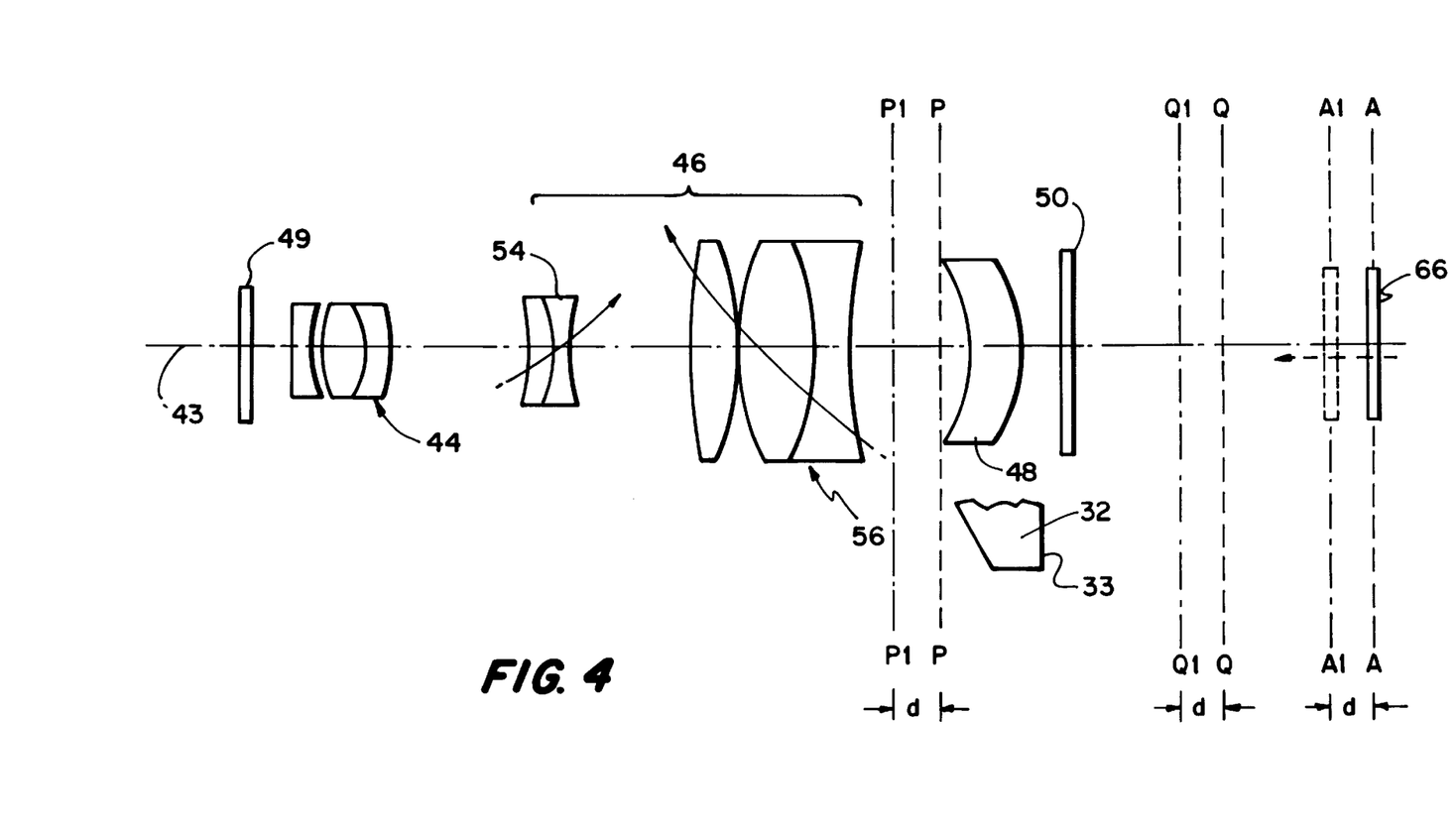
FIG. 4 is a schematic representation of the optics of the optical coupler of FIG. 2.
Figure 5:
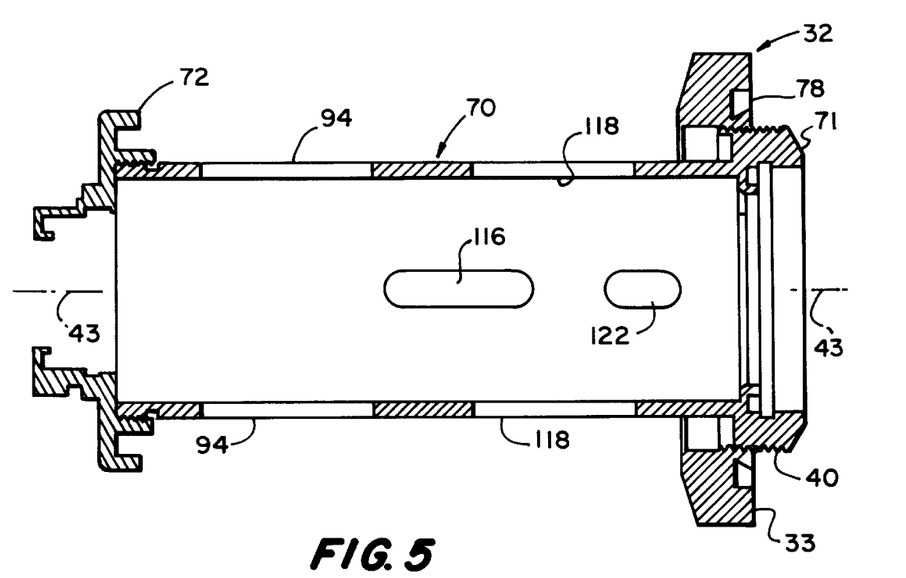
FIG. 5 is a cross-sectional side view of a main housing of the optical coupler of FIG. 2.

Referring to FIG. 4, to better understand how optical coupler 10 maintains true-zoom capability, optical coupler 10 is analyzed as follows. Focus lens group 44, zoom lens assembly 46 and back focal lens 48 are shown positioned to move relative to a mating end surface 33 of camera mount 32 and along optical axis 43. The optical image of an external object viewed by endoscope 12 (FIG. 1) and transmitted through optical coupler 10 is formed at a plane A-A beyond the proximal end of optical coupler 10 (i.e., proximally of surface 33, within camera 44). When camera head 14 is mounted to optical coupler 10, the photosensitive surface of its image sensor 66 should coincide with plane A-A to ensure that the coupler's true-zoom capability is maintained.

Focus lens group 44 forms an intermediate virtual image at a plane P-P. This image serves as a virtual object for zoom lens assembly 46, which conveys the image at plane P-P to another intermediate virtual image at a plane Q-Q. Zoom lens assembly 46 is designed so that an image of a virtual object at plane P-P is maintained at plane Q-Q even though lens groups 54, 56 are moved to magnify the image. In a lens system operating in this way, planes P-P and Q-Q are said to be optical conjugates. Finally, back focal lens 48 conveys an image of a virtual object at plane Q-Q to plane A-A, where the image sensor 66 is positioned. Plane A-A is an optical conjugate of both planes P-P and Q-Q.

When a different camera head 14 is mounted to optical coupler 10, the position of its image sensor 66' may be different than that of the previously mounted camera head 14. This is particularly true if the second camera head 14 is made by a different manufacturer than the first. For example, the new image sensor 66' (shown in dashed lines) may be positioned at a plane A1-A1 offset from plane A-A by a distance d. Optical coupler 10 may still be used with new image sensor positioned at plane A1-A1. However, because plane A1-A1 is not an optical conjugate of planes P-P and Q-Q, optical coupler 10 no longer has true-zoom capability, and the operator will have to re-focus the image whenever its magnification of the image is changed with zoom lens assembly 46.

Overall adjustment mechanism 60, however, moves focus lens group 44, zoom lens assembly 46, and back focal lens 48 together (in response to the activation of adjustment knob 34) to cause the intermediate virtual image planes of focus lens group 44 and zoom lens assembly 46 to shift together with respect to the plane of image sensor 66'. That is, both intermediate virtual image planes P-P and Q-Q move a distance d to new intermediate virtual image planes P1-P1 and Q1-Q1 so that the image is formed at new image plane A1-A1, which overlies the plane of the new position of image sensor 66' at the new position. Lens groups 44, 46, 48—as well as their associated virtual image planes—can also be seen to move together with respect to mating end surface 33 of camera mount 32 to restore true-zoom capability at the new image sensor position. Mating end surface 33 provides a convenient stationary reference on optical coupler 10 itself with respect to which lens groups 44, 46, 48 move.

Overall adjustment mechanism 60 is set each time a different camera head 14 is mounted to optical coupler 10 using the following procedure.

Referring again to FIG. 2, as a first step, the user rotates focus knob 36 and zoom knob 38 so that lines 61, 63 and 65 respectively, are focused on the exterior surfaces of knobs 36, 38 and camera mount 32. This positions focus lens assembly 44 so that it is focused at infinity, and places zoom lens assembly 46 at the midpoint of its zoom range. The user then points coupler 10 at a distant object, and rotates adjustment knob 34 to manipulate overall adjustment mechanism 60 until the object becomes sharply focussed. When this occurs, the user is assured that the position image plane A-A coincides with that of image sensor 66 (FIG. 4). A set screw 153 (FIG. 6A), threaded within adjustment knob 34, used to lock adjustment knob 34 is in position. With set screw 153 tightened down, adjustment knob 34 need not be moved again until a different camera head 14 is mounted on optical coupler 10.

Referring to FIGS. 5–9, the construction of optical coupler 10 will now be described. Optical coupler 10 includes a main housing 70 formed of anodized aluminum and having, at its proximal end, a flanged extension 71 with threads 40 (1.00-32 thread) of camera mount 32. Flanged extension 71 includes a circular groove 78 for holding an O-ring seal 79 which seals optical coupler 10 to camera head 14.

Figure 6A:
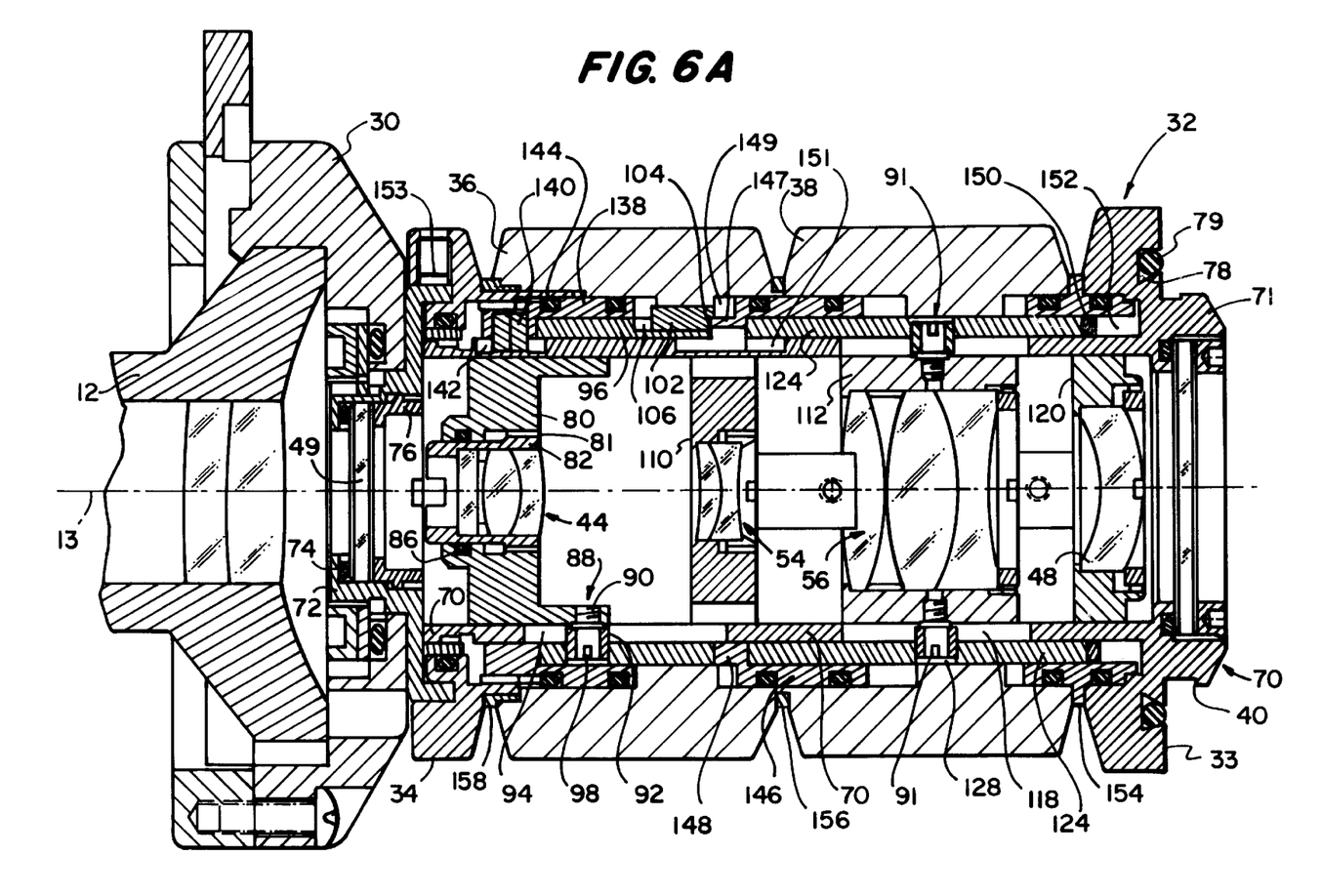
FIG. 6A is a cross-sectional side view of the optical coupler of FIG. 2.

As shown in FIG. 6A, main housing 70 extends along longitudinal axis 43 to its distal end where it engages a front housing 72 which provides a mount for endoscope coupling housing 30. Front window 49 is retained within front housing 72 between an O-ring seal 74 and a threaded retainer 76.

A focus group housing 80 is mounted within main housing 70 adjacent to front window 49. A focus collar 82, which supports focus lens group 44 is threaded within focus group housing 80 and is sealed therein with O-ring seal 86. Threads 81 permit the axial position of focus collar 82 to be adjusted within focus group 80 so that minor variations due to, e.g., manufacturing tolerances can be corrected.

As discussed above, the position of focus lens group 44 is controlled using focus control mechanism 52, which is constructed as follows. Focus control mechanism includes a pair of cam bearings 88 (only one is shown in FIG. 6A), each of which includes a cam screw 90 surrounded by a plastic bushing 92 and threaded within a hole formed in focus group housing 80. The holes are formed at diametrically opposed positions of main housing 70. Each cam bearing 88 is received within a corresponding elongated slot 94 (FIG. 5) formed along the axial length of main housing 70 to provide the extent of forward and rearward motion of focus group housing 80.

Figure 7:
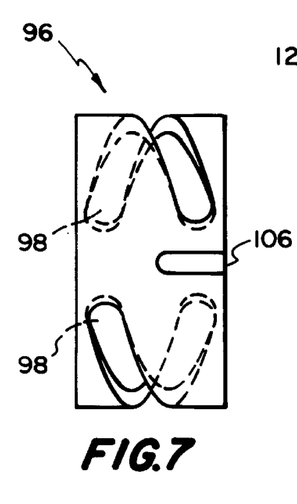
FIG. 7 is a side view of a focus sleeve of the optical coupler of FIG. 2.

A focus sleeve 96 formed of anodized aluminum surrounds the distal end of main housing 70 and focus group housing 80. As shown in FIG. 7, a pair of diametrically opposed helical grooves 98 are formed within focus sleeve 96, each of which is aligned with elongated slot 94 of main housing 70 and is engaged by a corresponding one of cam bearings 88. Focus knob 36 surrounds and engages focus sleeve 96 via a key 102, which fits within a slot 104 formed within an inner surface of focus knob 36 and extends into a slot 106 (FIG. 7) formed at a proximal end of focus sleeve 96. Thus, when focus knob 36 is rotated in either a clockwise or counterclockwise direction, torque is transmitted through key 102 to focus sleeve 96. The transferred rotation of focus sleeve 96 is conveyed to focus group housing 80 through cam bearings 88, causing focus group housing 80 to move axially along axis 43 to change the spacing between focus lens assembly 44 and image sensor 66 (FIG. 4), thereby focusing the image of the object being viewed. The helical path provided by grooves 98 would normally cause focus group housing 80 and attached focus lens group 44 to rotate about axis 64. However, because cam bearings 88 are captured within elongated slot 94 of main housing 70, focus group housing 80 is precluded from rotating as it moves along axis 64.

Zoom lens assembly 46 is coaxially positioned within main housing 70 proximally of focus lens group 44 with zoom lens groups 54, 56 retained within first and second zoom housings 110, 112, respectively, with threaded retainers or epoxy. First and second zoom housings 110, 112 are mounted within main housing 70 with their axial positions controlled by zoom control mechanism 58 (FIG. 3). Zoom control mechanism 58 uses cam bearings 89, 91 which are threaded within holes formed in first and second zoom housings 110, 112, respectively. Cam bearings 89 (FIG. 6B) associated with first zoom housing 110 are offset 90 degrees from cam bearings 91 (FIG. 6A) of second zoom housing 112. The cam bearings are identical to those associated with focus control mechanism 52 in that they include cam screws surrounded by plastic bushings and are positioned at diametrically opposed positions along their respective housings. Cam bearings 89, 91 are received within oblong slots 116, 118 (FIG. 5), respectively, formed along the axial length of main housing 70 to prevent zoom housings 110, 112 from rotating as they move axially along the length of coupler 10.

Back focal lens 48 is coaxially positioned within main housing 70 behind zoom lens group 46 and is retained within a back focal lens housing 120. Back focal lens housing 120 also includes threaded holes which receive cam bearings 121 (FIG. 6B) identical to those associated with focus and zoom control mechanisms 53, 58. Cam bearings 121 associated with back focal lens housing 120 are received within corresponding oblong slots 122 (FIG. 5) formed along the axial length of main housing 70 to restrict back focal lens housing 120 to move axially along the length of the coupler without rotating.

Figures 8, 9:
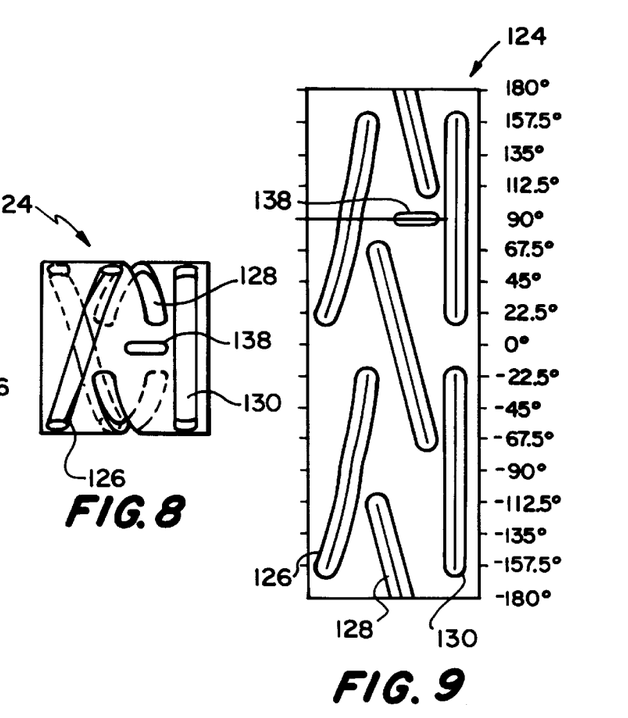
FIG. 8 is a side view of a zoom sleeve of the optical coupler of FIG. 2.
FIG. 9 is a plan, unfurled view of the zoom sleeve of the optical coupler of FIG. 2.

A zoom sleeve 124 formed of anodized aluminum surrounds first and second zoom housings 110, 112 and the distal end of back focal lens housing 120. As shown in FIGS. 8 and 9, pairs of diametrically opposed helical grooves 126, 128 are formed within zoom sleeve 124. Each pair of grooves 126, 128 are aligned with oblong slots 116, 118 of main housing 70 and are engaged by corresponding ones of cam bearings 89, 91. In particular, first pair of grooves 126 are formed at the distal end of zoom sleeve 124 and are engaged by cam bearings 89 associated with first zoom housing 110. Likewise, second pair of grooves 128 formed adjacent to grooves 126 are engaged by cam bearings 91 of second zoom housing 112. A pair of straight grooves 130 formed at the proximal end of zoom sleeve 124 are engaged by cam bearings 121 associated with back focal lens housing 120.

Figure 6B:
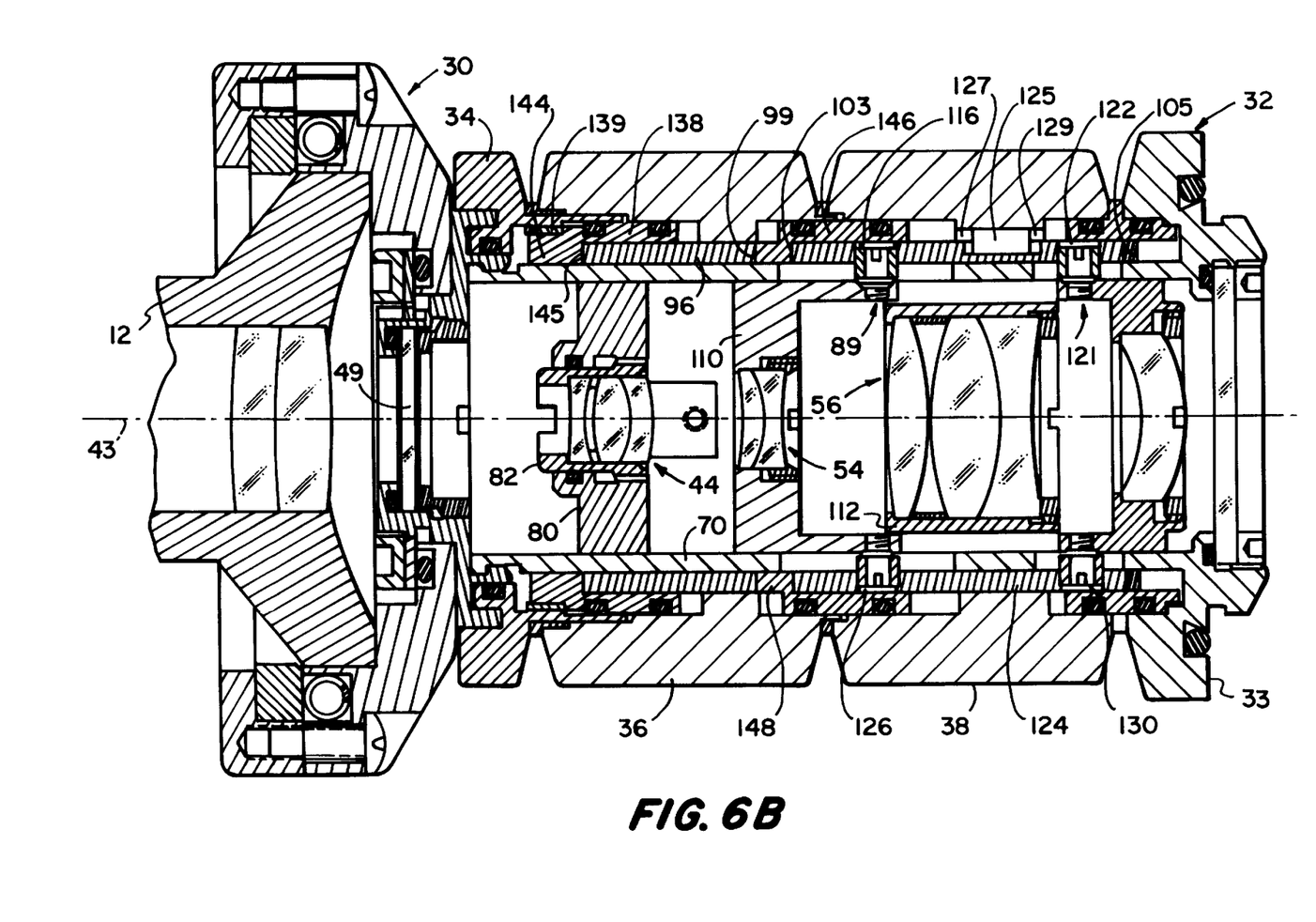
FIG. 6B is a cross-sectional side view of the optical coupler of FIG. 2 rotated by 90° relative to FIG. 6A.

As shown in FIG. 6B, zoom knob 38 surrounds and engages zoom sleeve 124 via a key 125 which is fitted within a recess 127 formed along an inner surface of zoom knob 38 and extends into a slot 129 formed within zoom sleeve 124. Rotation of zoom knob 38 in either a clockwise or counter-clockwise direction is transmitted through key 125 to zoom sleeve 124 and transferred via cam bearings 89, 91 to move first and second zoom housings 110, 112. Thus, rotation of zoom knob 38 causes the first and second zoom housings 110, 112 to move with respect to each other along axis 43, thereby changing the relative spacing between lenses 54 and lenses 56 and inducing a corresponding change in the image size of the object being viewed.

It is important to note that the geometry of grooves 126 and 128 are specifically designed so that lenses 54 and 56 of zoom lens assembly 46 move in opposite directions, toward and away from each other in response to the rotation of zoom knob 38, while still functioning as a "true zoom" system. Any design methodology may be used to provide the required geometry on the basis of the particular configuration and lenses used in coupler 10. For example, Chapter 4: "Design of Zoom Lenses", by K. Yamagi, in *Progress in Optics*, Vol. VI, (1967) describes one approach and the relationships which can be used to provide a lens design program.

Referring to FIG. 9, groove 126, 128 are shaped to provide a linear relationship between the degree of magnification and rotation of the zoom knob 38. That is, the magnification is degree of is linearly related to the range of rotation. In this embodiment, groove 128 is selected to have a helical shape and groove 126, therefore, requires a non-helical shape to provide the desired linear relationship. In general, the selected shape of one of grooves will dictate the shape of the other groove. In addition, groove 126 in conjunction with groove 128 maintains the intermediate virtual image plane (e.g., plane Q-Q) at the proper position for true zoom capability.

Back focal lens 48 is coaxially positioned within main housing 70 behind zoom lens group 46 and is retained within a back focal lens housing 120. Back focal lens housing 120 also includes threaded holes which receive cam bearings 121 (FIG. 6B) identical to those associated with focus and zoom control mechanisms 52, 58. As discussed, cam bearings 121 associated with back focal lens housing 120 are received within corresponding oblong slots 122 (FIG. 5) formed along the axial length of main housing 70. Cam bearing 121 are also received within grooves 130 formed within zoom sleeve 124. Grooves 130 extend in a straight line along the circumference of zoom sleeve 124 (i.e, grooves 130 have no axial component) so that back focal lens housing 120 remains axially stationary when zoom knob 38 is rotated. The engagement of cam bearings 121 within grooves 130 allows back focal lens housing 120 to move with the first and second zoom lens housings 110, 112 and focus lens housing 80 when overall adjustment mechanism 60 is used to adjust for different image sensing positions.

Overall adjustment mechanism 60 is mechanically configured so that focus lens group 44, zoom lens groups 54, 56 and back focal lens 48 are mechanically coupled to allow their movement together, in response to rotating adjustment knob 34. Moreover, overall adjustment mechanism 60 is mechanically configured to allow movement of focus lens group 44 and zoom lens groups 54 independently, in response to rotating focus knob 36 and zoom knob 38, respectively, after adjustment mechanism 60 has been set and locked in place. The first function is accomplished by mechanically coupling focus lens housing 80, first and second zoom lens housings 110, 112 and back focal lens housing 120 in a tandem arrangement which is held together by a spring force. The second function is accomplished using an adjustment collar 138, which couples adjustment knob 34 to the tandem arrangement, and an anti-rotation ring 146 which allows independent movement of focus lens group 44 and zoom lens groups 54 for focusing and magnifying the image of an object being viewed.

The specific construction of overall adjustment mechanism 60 follows. Adjustment knob 34 is positioned at the distal end of optical coupler 10 axially between endoscope coupling housing 30 and focus knob 36. As discussed above, rotating adjustment knob 34 causes focus lens group 44, zoom lens groups 54, 56 and back focal lens 48 to move together with respect to mating end surface 33 to adjust for differences in the position of an image sensor 66. Adjustment collar 138 is positioned between focus sleeve 96 and focus knob 36, and includes threads 139 which mate with adjustment knob 34. Adjustment collar 138 includes a pin 140 which engages an opening 142 formed within main housing 70 to cause adjustment collar 138 to move axially along the length of coupler 10 rather than rotate when adjustment knob 34 is rotated. Adjustment collar 138 includes a flange 144 which abuts distal end surface 145 of focus sleeve 96.

Focus sleeve 96 extends to proximal end surface 99, where it abuts a flanged shoulder 148 of anti-rotation ring 146. Flanged shoulder 148 couples proximal end surface 99 to distal end surface 103 of zoom sleeve 132. A key 147 is positioned between a slot 149 formed within anti-rotation ring 146, and a slot 151 formed within main housing 70. Key 147 limits movement of anti-rotation ring 146 to the axial direction and prevents the ring from rotating. Anti-rotation ring 146 isolates focus sleeve 96 from zoom sleeve 132 so that rotation of focus knob 36 or zoom sleeve 132 does not cause the other to rotate even though sleeves 96, 132 both abut flanged shoulder 148 of anti-rotation ring.

Zoom sleeve 132 extends to proximal end surface 105, where it abuts a spring washer 150 which surrounds main housing 70 at the proximal end of the optical coupler 10. Spring washer 150 is formed of plastic and provides a smooth bearing surface between zoom sleeve 132 and housing 70, both of which are formed of metal and thus would be susceptible to galling if allowed to move against each other. Spring washer 150 also contacts a steel wave spring 152, which provides the force necessary to maintain adjustment collar 138, focus sleeve 96, anti-rotation ring 146, zoom sleeve 132 and spring washer 150 in compression so that rotation of adjustment knob 34 causes the lens systems to move together along axis 43. Wave spring 152 is selected to provide an axial force sufficient to maintain the tandem arrangement of adjustment collar 138, focus sleeve 96, anti-rotation ring 146, zoom sleeve 132 and spring washer 150 together when adjustment knob 34 is rotated, while also allowing free rotation of focus knob 36 and zoom knob 38.

Set screw 153 is threaded within adjustment ring 34 and is tightened to engage front housing 72 to prevent rotation of adjustment ring 34 and movement of focus lens group 44, zoom lens groups 54, 56, and back focal lens 48 as a unit. When a new camera is mounted to coupler 10, set screw 153 is loosened, adjustment ring 34 rotated to establish a new image sensing position using the procedure described above, and set screw 153 re-tightened to lock the adjustment ring 34 in place.

A plastic seal ring 154 supports a pair of O-rings 156 to provide a fluid-tight seal between zoom knob 38 and main housing 70. Seal ring 154 includes a flange 155 which extends between zoom knob 38 and camera mount 32 and provides an anti-friction bearing surface therebetween. Plastic thrust washer 156 is also positioned between the zoom knob 38 and focus knob 36 and a plastic bearing 158 is positioned between focus knob 36 and adjustment knob 34. Both plastic thrust washer 156 and plastic bearing 158 serve to avoid metal-on-metal contact between the knobs.

Other embodiments are within the scope of the claims.

Figure 10:
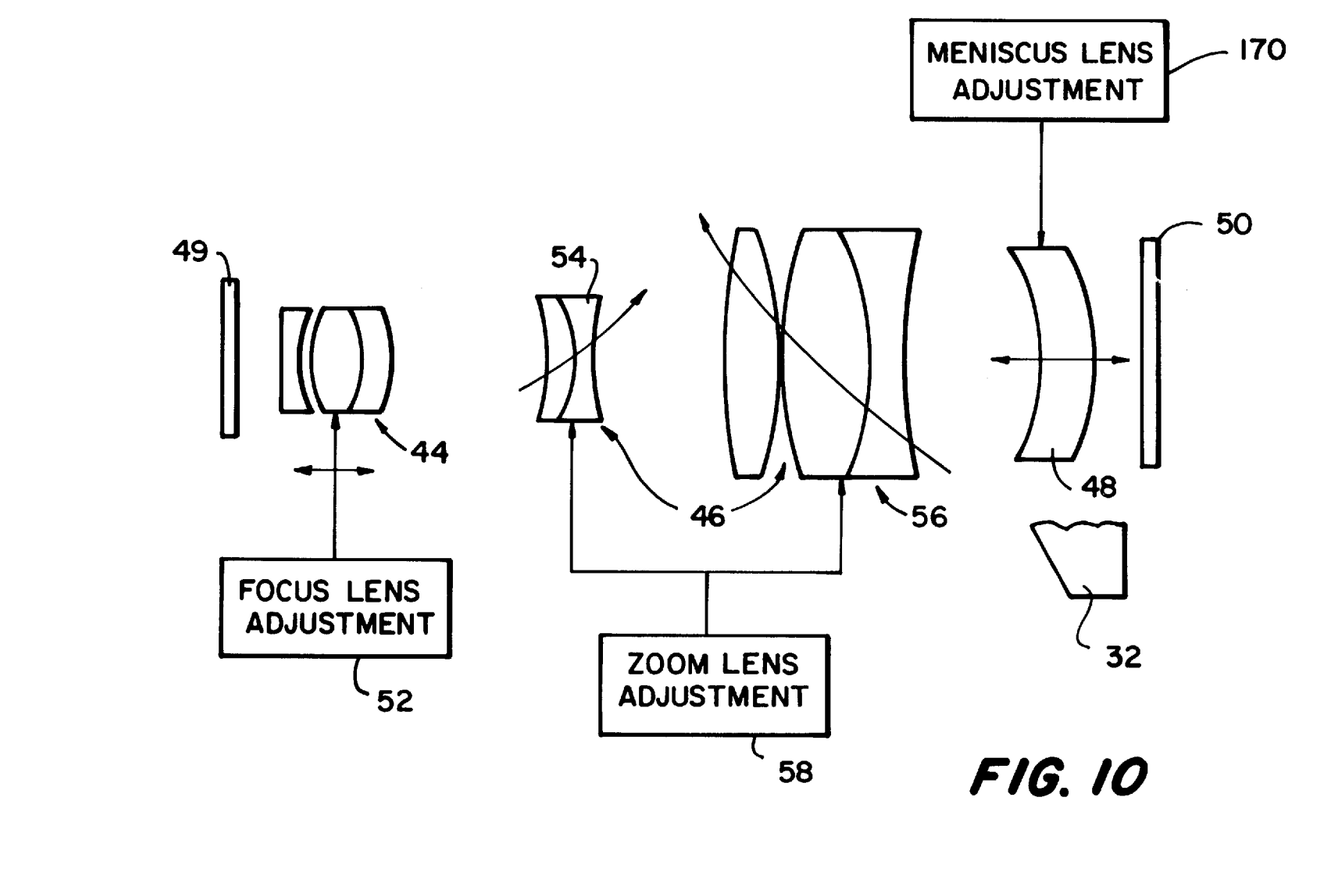
FIG. 10 is a diagrammatic representation of an alternative optical coupler.

For example, referring to FIG. 10, an alternative approach for aligning the final image plane of optical coupler 10 to the plane overlying the position of a newly mounted image sensor is shown. In this embodiment, an adjustment mechanism 170 is used to move only back focal lens 48 relative to camera mount 32, rather than moving the focus lens group 44, zoom lens assembly 46 and back focal lens 48 together as a unit. Adjustment mechanism 170 for moving back focal lens 48 includes a sleeve surrounding the proximal end of main housing 70 and back focal lens housing 120.

Unlike the embodiment described above in conjunction with FIGS. 1–2 and 5–9, back focal lens 48 would not be supported within zoom sleeve 132, but is instead supported by a sleeve independent of that associated with zoom lens group 46. The sleeve supporting the back focal lens housing would include a pair of diametrically opposed helical grooves, each of which is aligned with an elongated slot of main housing 70 and is engaged by a corresponding one of a pair of cam bearings. A separate knob would surround and engage the sleeve via a key which fitted within a slot formed within an inner surface of the knob, and extending into a slot formed at a proximal end of the sleeve. Thus, when the knob is rotated in either a clockwise or counterclockwise direction, torque is transmitted through the key to move the sleeve with respect to focus lens group 44 and zoom lens group 46. The transferred rotation of the sleeve is conveyed to back focal lens housing 120 through the cam bearings, causing back focal lens housing 120 to move axially along axis 43 to change the spacing between back focal lens 48 and the image sensor 66 (FIG. 4) of camera head 14, thereby aligning the final image plane of the optical coupler to the plane overlying the position of a newly mounted image sensor.

Moving only back focal lens 48 shifts the intermediate virtual image (created by zoom lens assembly 46) at plane Q1-Q1 to the desired image plane of the image sensor, for example plane A1-A1 (FIG. 4). Moving only back focal lens 48 more than a relatively small distance will introduce optical aberrations in the lens system. Compensating for these optical aberrations requires a more complex design of the lens system which may require, for example, a greater number of lenses. Thus, this alternative approach for accommodating a new image sensor position may be best suited for situations where the expected deviation in image sensor position is relatively small from camera-to-camera.

What is claimed is:

1. An optical coupler for coupling a camera to an endoscope, the coupler comprising:
   a housing enclosing a chamber;
   a mount disposed at a proximal end of the housing to receive the camera;
   a focus lens disposed within the chamber and actuatable for movement along the length of the coupler to provide a focussed image of an object being viewed by the endoscope;
   a zoom lens assembly within the chamber and actuatable for movement along the length of the coupler to provide a magnified image of the object being viewed; and
   an adjustment mechanism which is actuated to move said focus lens and the zoom lens assembly together as a unit along the length of said coupler relative to the mount.

2. The optical coupler of claim 1 wherein the focus lens is disposed at a distal end of the coupler and the zoom lens assembly is disposed between the focus lens and the mount.

3. The optical coupler of claim 1 wherein the zoom lens assembly includes first and second zoom lenses actuated to move relative to each other.

4. The optical coupler of claim 1 wherein the mount is an integral threaded extension of the housing.

5. The optical coupler of claim 1 further comprising:
   a focusing mechanism having a rotatable focus knob and a first mechanical coupling which couples the focus knob to the focus lens to move the focus lens along the length of the coupler in response to rotation of the focus knob;
   a zooming mechanism having a rotatable zoom knob and a second mechanical coupling which couples the zoom knob to the zoom lens assembly along the length of the coupler in response to rotation of the zoom knob;
   wherein, the adjustment mechanism includes a rotatable adjustment knob and a third mechanical coupling which couples the adjustment knob to the first mechanical coupling of the focusing mechanism and the second mechanical coupling of the zooming mechanism, the first and second mechanical couplings moving along the length of the coupler in response to rotation of the adjustment knob.

6. The optical coupler of claim 5 wherein the third mechanical coupling includes an adjustment collar coupled between the adjustment knob and the first mechanical coupling and an adjustment ring coupled between the first and second mechanical couplings.

7. The optical coupler of claim 5 wherein said overall adjustment mechanism further comprises a biasing mechanism to bias said adjustment collar, said first mechanical coupling, said adjustment ring and said second mechanical coupling in compression.

8. The optical coupler of claim 5 wherein said biasing mechanism includes a spring washer positioned between said mount and said second mechanical coupling.

9. The optical coupler of claim 1 wherein said adjustment mechanism further includes a locking device to fix the position of said adjustment mechanism.

10. An optical coupler of for coupling a camera to an endoscope, the coupler comprising:

a housing enclosing a chamber;

a mount disposed at a proximal end of the housing to receive the camera;

a focus lens disposed within the chamber and actuatable for movement along the length of the coupler to provide a focussed image of an object being viewed by the endoscope;

a zoom lens assembly within the chamber and actuatable for movement along the length of the coupler to provide a magnified image of the object being viewed, the zoom lens assembly including first and second zoom lenses actuated to move relative to each other;

a focusing mechanism having a rotatable focus knob and a first mechanical coupling which couples the focus knob to the focus lens to move the focus lens along the length of the coupler in response to rotation of the focus knob, wherein the focusing mechanism further comprises a first follower and the first mechanical coupling includes a first surface, the first follower configured to move along the first surface in response to rotation of the focus knob; and a zooming mechanism including:
a rotatable zoom knob and a second mechanical coupling which couples the zoom knob to the zoom lens assembly along the length of the coupler in response to rotation of the zoom knob;
a second follower coupled to said first zoom lens,
a third follower coupled to said second zoom lens,
and the second mechanical coupling includes second and third fourth surfaces, the second and third followers configured to move along the second and third surfaces, respectively, in response to rotation of the zoom knob;

an adjustment mechanism which is actuated to move said focus lens and the zoom lens assembly together as a unit along the length of said coupler relative to the mount, the adjustment mechanism including a rotatable adjustment knob and a third mechanical coupling which couples the adjustment knob to the first mechanical coupling of the focusing mechanism and the second mechanical coupling of the zooming mechanism, the first and second mechanical couplings moving along the length of the coupler in response to rotation of the adjustment knob.

11. The optical coupler of claim 10 wherein
said first, second and third surfaces comprise first, second and third grooves, respectively, said first, second and third followers riding within respective first, second and third grooves, and said housing comprising:
first, second and third slots provided along portions of the length of the housing, said first, second and third followers riding within said first, second and third slots, respectively, to prevent rotation of said first and second mechanical couplings when said focus knob and said zoom knob are rotated.

12. The optical coupler of claim 1 further comprising a back focal lens positioned between the zoom lens assembly and a proximal end of the housing.

13. The optical coupler of claim 12 wherein the second mechanical coupling couples the zoom knob to the back focal lens.

14. An endoscopic system of the type coupled to a camera and for providing internal inspection of an object, the endoscopic system comprising:

an endoscope having an outer tube and a lens system for conveying an image of the object from a distal end to a proximal end of the outer tube;

an optical coupler having a distal end coupled to the proximal end of the endoscope for conveying the image of the object at the proximal end of the outer tube to the camera mounted to a proximal end of the coupler, the coupler comprising:
a housing enclosing a chamber;
a mount disposed at a proximal end of the housing to receive the camera;
a focus lens disposed within the chamber and actuatable for movement along the length of the coupler to provide a focussed image of an object being viewed by the endoscope;
a zoom lens assembly within the chamber and actuatable for movement along the length of the coupler to provide a magnified image of the object being viewed; and
an adjustment mechanism which is actuated to move said focus lens and the zoom lens assembly together as a unit along the length of said coupler relative to the mount.

15. A method of endoscopically viewing an object comprising the steps of:

providing an optical coupler having a mount, an actuatable focus lens which moves along the length of the coupler to provide a focussed image of an object being viewed by the endoscope, and an actuatable zoom lens assembly which moves along the length of the coupler to provide a magnified image of the object being viewed;

coupling an endoscope to a distal end of the optical coupler to convey an image of the object to the optical coupler;

coupling a camera to the mount of the optical coupler, the camera having an image sensor; and moving the focus lens and the zoom lens assembly together as a unit along the length of said coupler relative to the image sensor.

16. The method of claim 15 further comprising focusing the focus lens at infinity, pointing the optical coupler with endoscope and camera at a distant object, followed by said moving step including moving the focus lens and zoom lens assembly along the length of the coupler until the distant object is sharply focused.

17. The method of claim 16 further comprising the step of locking the focus lens and zoom lens assembly to prevent movement of the focus lens and zoom lens as a unit while allowing independent movement with respect to each other.

18. An optical coupler for coupling a camera to an endoscope, the coupler comprising:
    a housing enclosing a chamber;
    a mount disposed at a proximal end of the housing to receive the camera;
    a focus lens disposed within the chamber and actuatable for movement along the length of the coupler to provide a focussed image of an object being viewed by the endoscope;
    a zoom lens assembly within the chamber and actuatable for movement along the length of the coupler to provide a magnified image of the object being viewed;
    a back focal lens positioned between the zoom lens assembly and the proximal end of the housing; and
    an adjustment mechanism which is actuated to move said back focal lens along the length of said coupler and relative to the mount.

19. The optical coupler of claim 18 further comprising a focusing mechanism having a rotatable focus knob and a first mechanical coupling which couples the focus knob to the focus lens which moves along the length of the coupler in response to rotation of the focus knob;
    a zooming mechanism having a rotatable zoom knob and a second mechanical coupling which couples the zoom knob to the first and second zoom lenses which move along the length of the coupler in response to rotation of the zoom knob; and
    wherein, the adjustment mechanism includes a rotatable adjustment knob and a third mechanical coupling which couples the adjustment knob to the back focal lens which moves along the length of the coupler in response to rotation of the adjustment knob.

* * * * *